Nov. 4, 1969 P. D. AGARWAL 3,476,998
MOTOR POWER SUPPLY SYSTEM
Filed Dec. 30, 1966
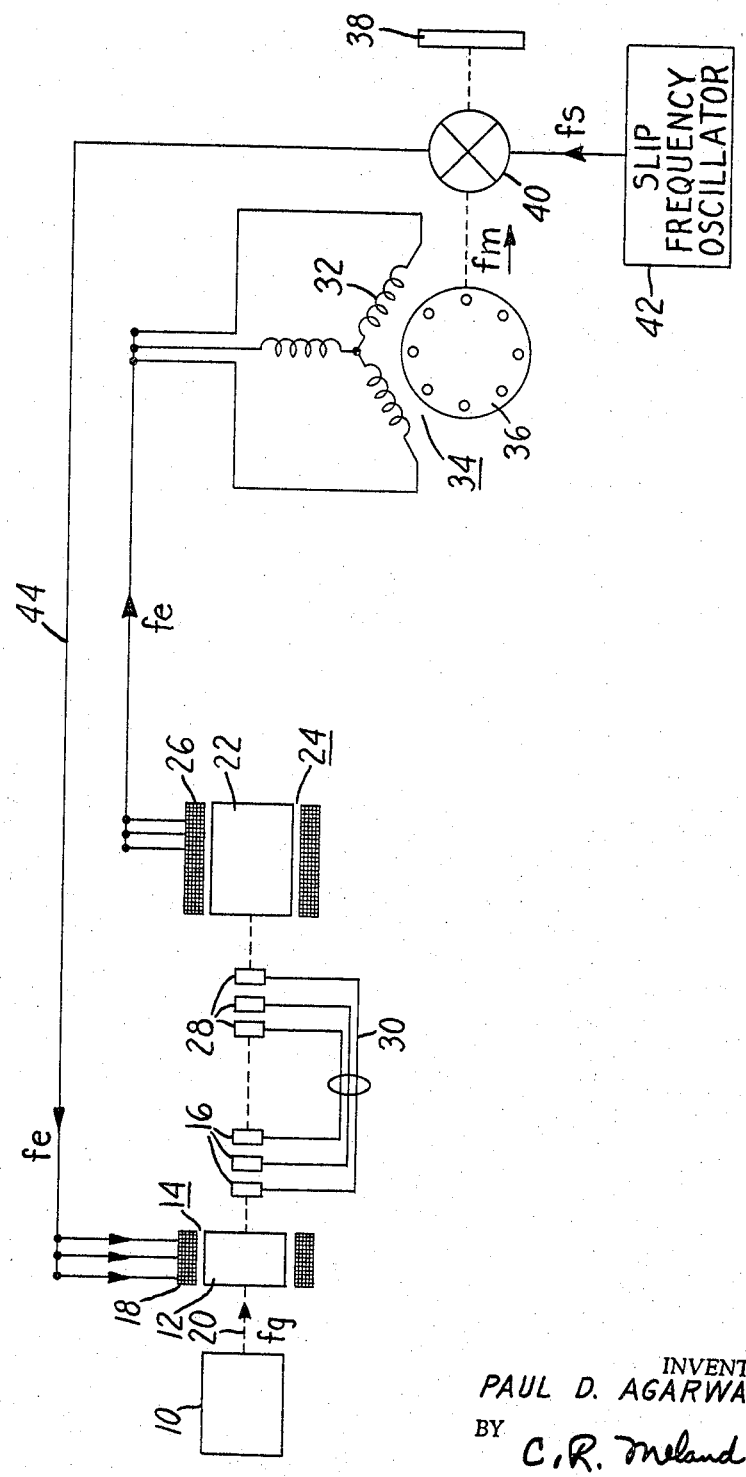
INVENTOR.
PAUL D. AGARWAL
BY C. R. Meland
ATTORNEY

United States Patent Office 3,476,998
Patented Nov. 4, 1969

3,476,998
MOTOR POWER SUPPLY SYSTEM
Paul D. Agarwal, Santa Barbara, Calif., assignor to General Motors Corporation, Detroit, Mich., a corporation of Delaware
Filed Dec. 30, 1966, Ser. No. 606,396
Int. Cl. H02p 5/20
U.S. Cl. 318—146                                   7 Claims

ABSTRACT OF THE DISCLOSURE

A power supply system for an induction motor including two wound rotor induction motors operating as generators. The output winding of one of the generators feeds electrical power to the induction motor and has its input winding connected with the output winding of the other generator. The two generators are electrically connected such that the output frequency of the two generator system is independent of the speed of rotation of the rotors of the generators. The output frequency of the two generator system is controlled as a function of actual induction motor rotor speed and a desired slip frequency for the motor.

---

This invention relates to a power supply system for an induction motor where the slip frequency of the induction motor can be adjusted and when adjusted, remains substantially constant at the set value over the varying speed range of the induction motor.

One method of obtaining a constant but adjustable slip frequency for an induction motor is illustrated in co-pending U.S. patent application Ser. No. 295,954, filed in the name of Paul D. Agarwal on July 18, 1963, and now U.S. Patent 3,323,032. In this system, an induction motor is supplied with current through a solid state inverter which may be comprised of controlled rectifiers, transistors or the like.

In contrast to the just-described inverter system, it is an object of this invention to provide a motor power supply system where an induction motor has a constant but adjustable slip frequency and where the induction motor is electrically connected with a generator driven by a prime mover. The connection between the generator and motor has no intervening inverter and can take the form of wires which directly connect the generator and motor.

Another object of this invention is to provide an improved traction motor power supply system for a vehicle where the traction motors are induction motors and where the system is arranged such that the induction motors have a constant but adjustable slip frequency.

Another object of this invention is to provide a motor power supply system where the output frequency of the generating means is independent of shaft speed. In carrying this object forward, two wound rotor induction motors are utilized and the arrangement is such that the changing speed effect of the prime mover is cancelled so that the frequency of the output voltage of one of the motors when used as a generator is independent of shaft speed.

Further objects and advantages of the present invention will be apparent from the following description, reference being had to the accompanying drawing, wherein a preferred embodiment of the present invention is clearly shown.

In the drawing:

The single figure drawing is a schematic illustration of a motor power supply system made in accordance with this invention.

Referring now to the drawing, the reference numeral 10 designates a prime mover which can be, for example, an engine where the power supply of this invention is utilized to propel a vehicle.

The engine 10 is mechanically coupled to the rotor 12 of a wound rotor polyphase induction motor designated by reference number 14. The rotor 12 has a conventional polyphase winding connected with slip rings 16 and has a stator core carrying a conventional polyphase stationary winding designated by reference numeral 18. The windings for the rotor and stator have not been illustrated since they are conventional.

The drive shaft 20 which is driven by the prime mover 10 drives the rotor 12 and also drives a rotor 22 of a second wound rotor induction motor generally designated at 24. The wound rotor induction motor 24 has a stator core carrying a polyphase stationary winding 26. The rotor winding for the rotor 22 is electrically connected with the slip rings 28. The slip rings 16 and 28 are connected by conductors 30.

The wound rotor induction motor 24 is of the same construction as induction motor 14 but is larger in capacity. Both of these machines are used as generators as is more fully described hereinafter.

The polyphase stator winding 26 of the dynamoelectric machine 24 is utilized as a generator winding and is connected with the polyphase winding 32 of a polyphase squirrel cage induction motor generally designated by reference 34. The motor 34 has a squirrel cage rotor 36 which is mechanically coupled to a load such as a wheel 38 on a vehicle. The rotor 36 also is mechanically coupled to a frequency transducer 40.

The frequency transducer 40 is electrically connected with a slip frequency oscillator 42 which is operative to supply a signal to the frequency transducer 40 that is adjustable. In other words, the frequency of the signal applied to the frequency transducer 40 can be adjusted over a predetermined frequency range. The details of the oscillator form no part of the present invention and can take a wide variety of forms. The signal supplied to the frequency transducer 40 will hereinafter be designated as $f_s$.

The frequency transducer 40 must be a device which provides an output signal $f_e$ which is a summation of the speed of rotor 36 and slip frequency $f_s$. If the motor speed signal is designated as $f_m$, the frequency of the summation signal $f_e$ will be equal to $f_m$ added to $f_s$.

One type of device that can be used as the frequency transducer 40 is disclosed in above-mentioned copending patent application Ser. No. 295,954, filed on July 18, 1963, and now U.S. Patent 3,323,032. In the arrangement of this patent application, an electromagnetic differential is provided where the output of the slip frequency oscillator is fed into a two phase generator rotor mounted on the drive motor shaft. The stator of this generator then has an output frequency which is equal to $f_e$.

The output frequency $f_e$ of the frequency transducer 40 is applied to the polyphase winding 18 of the wound rotor machine 14 by line 44.

In operation, the prime mover 10 drives the rotors of dynamoelectric machines 14 and 24. The polyphase stationary winding 18 of the machine 14 is supplied with a polyphase voltage having a frequency $f_e$. When the stator of a wound rotor induction motor is excited by polyphase AC power of the frequency $f_e$, the voltage developed at the slip rings 16 will have a frequency $f_e \pm f_g$ depending on the direction of rotation of the rotor where $f_g$ corresponds to the speed of rotation of the drive shaft 20. The output voltage at slip rings 16 will have a frequency $f_e + f_g$ if the direction of rotation of the rotor is opposite to that of the rotating field of a frequency $f_e$ and will subtract if the rotation is in the same direction.

Since the output voltage of the slip rings 16 is applied to the rotor 22 and since the output voltage of polyphase winding 26 is applied to the drive motor, the drive motor will receive a voltage of a frequency $f_e$ since the frequency $f_g$ can be subtracted in the generator 14 and added in the generator 24 to thus cancel out the effect of changing shaft speed. In other words, by proper direction of rotation of the rotors 12 and 22 with proper regard to the direction of rotation of the rotating field in these machines, it is possible to cancel out the factor of shaft speed.

It will be appreciated from the foregoing that the frequency of the polyphase voltage applied to the stator winding 32 of the induction motor 34 will always be $f_e$ regardless of prime mover shaft speed and this frequency will vary depending upon drive motor shaft speed and upon the output frequency of the slip frequency oscillator 42. The output frequency of the oscillator can be adjusted to vary the slip frequency of the induction motor but once adjusted, the slip frequency remains constant over the warying speed range of the induction motor.

The motor control system that has just been described has particular utility for supplying the traction motors in a vehicle system. Thus by using an induction motor as the traction motor, there are no commutation problems and the commutator flashover problem which is prevalent in DC traction motors is eliminated. As compared to a solid state inverter system, the present invention has advantages since it eliminates the need of high power controlled rectifiers and electric drive systems of any power rating can be fabricated.

While the embodiment of the invention as herein disclosed constitutes a preferred form, it is to be understood that other forms might be adopted.

What is claimed is as follows:

1. A power supply system for an induction motor comprising, an induction motor including an energizing winding and a rotor, first and second wound rotor generators, each generator having a stationary winding and a rotor winding carried by a rotor of the machine, the frequency of the output voltage of each generator being a function of input frequency and rotor speed, means connecting said stationary winding of said second generator with said energizing winding of said induction motor whereby the voltage generated in said stationary winding of said second generator energizes said induction motor, means electrically connecting the rotor winding of said first generator with the rotor winding of said second generator, a prime mover, means connecting said rotors together and to said prime mover in such a manner that said rotors rotate at the same speed and at a speed related to prime mover speed, means for developing a first signal which is a function of the rotor speed of said induction motor, means for developing a second signal which is indicative of a desired slip frequency for said induction motor, means for combining said first and second signals to provide a third signal the frequency of which is a function of said first and second signals, and means for applying said third signal to said stationary winding of said first generator, said first and second dynamoelectric machines being connected in such a manner that the output frequency of the power generated in said stationary winding of said second dynamoelectric machine is independent of prime mover speed but dependent upon said third signal.

2. The motor control system according to claim 1 where the induction motor is coupled to the wheel of a motor vehicle.

3. The motor control system according to claim 1 where said second signal has a frequency which is adjustable to adjust the slip of the induction drive motor.

4. A motor power supply system comprising, first and second dynamoelectric machines each having a rotor winding carried by a rotor and a stator winding, one of said rotor and stator windings forming an input winding for the dynamoelectric machine and the other of said rotor and stator windings forming an output winding for the dynamoelectric machine, each dynamoelectric machine generating an output voltage in its output winding the frequency of which is a function of the frequency of a current applied to its input winding and rotor speed, a prime mover, means mechanically connecting said rotors together and to said prime mover in such a manner that said rotors rotate at the same speed and at a speed which is a function of prime mover speed, an induction drive motor having an energizing winding and a rotor, means connecting the output winding of said second dynamoelectric machine to said energizing winding of said induction motor, means connecting the output winding of said first dynamoelectric machine with said input winding of said second dynamoelectric machine, means for deriving a first signal which is a function of the speed of rotation of the rotor of said drive motor, means for deriving a second signal which is indicative of a desired slip frequency for said motor, means for combining said first and second signals to provide a third signal the frequency of which is a function of said first and second signals, and means for applying said third signal to the input winding of said first dynamoelectric machine, said dynamoelectric machines being so electrically connected that the factor of rotor speed of said dynamoelectric machine rotors is cancelled during frequency changes within said machines whereby the frequency of the current applied to said induction motor from said output winding of said second dynamoelectric machine is independent of shaft speed but dependent upon and a function of actual motor rotor speed and desired slip frequency.

5. The motor power supply system according to claim 4 where two dynamoelectric machines are each wound rotor induction motors and where the slip rings of the two machines are electrically connected.

6. The electrical motor power supply system according to claim 4 where the motor is coupled to a wheel for propelling a vehicle.

7. The motor power supply system according to claim 4 where said second signal can be adjusted as to frequency.

References Cited

UNITED STATES PATENTS

| 783,708 | 2/1905 | Stanley | 322—61 |
| 3,372,323 | 3/1968 | Guyeska | 318—231 |

ORIS L. RADER, Primary Examiner

K. L. CROSSON, Assistant Examiner

U.S. Cl. X.R.

318—231; 321—64; 322—32